US010409873B2

(12) United States Patent
Mashiach et al.

(10) Patent No.: US 10,409,873 B2
(45) Date of Patent: Sep. 10, 2019

(54) SEARCHING FOR CONTENT BY KEY-AUTHORS ON ONLINE SOCIAL NETWORKS

(71) Applicant: Facebook, Inc., Menlo Park, CA (US)

(72) Inventors: Li-Tal Mashiach, Redmond, WA (US); Igor Ribeiro de Assis, San Francisco, CA (US); Alexander Perelygin, Mountain View, CA (US); Veselin S. Stoyanov, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 282 days.

(21) Appl. No.: 14/554,190

(22) Filed: Nov. 26, 2014

(65) Prior Publication Data

US 2016/0147893 A1 May 26, 2016

(51) Int. Cl.
*G06F 17/30* (2006.01)
*G06F 16/9535* (2019.01)
*G06Q 50/00* (2012.01)

(52) U.S. Cl.
CPC ......... *G06F 16/9535* (2019.01); *G06Q 50/01* (2013.01)

(58) Field of Classification Search
CPC .......... G06F 17/30687; G06F 16/9535; G06Q 50/01
USPC ...................................................... 707/710
See application file for complete search history.

(56) References Cited

U.S. PATENT DOCUMENTS

| | | | |
|---|---|---|---|
| 5,918,014 A | 6/1999 | Robinson | |
| 6,539,232 B2 | 3/2003 | Hendrey | |
| 6,957,184 B2 | 10/2005 | Schmid | |
| 7,069,308 B2 | 6/2006 | Abrams | |
| 7,379,811 B2 | 5/2008 | Rasmussen | |
| 7,539,697 B1 | 5/2009 | Akella | |
| 7,752,326 B2 | 7/2010 | Smit | |
| 7,836,044 B2 | 11/2010 | Kamvar | |
| 8,027,990 B1 | 9/2011 | Mysen | |
| 8,060,639 B2 | 11/2011 | Smit | |
| 8,112,529 B2 | 2/2012 | Van Den Oord | |

(Continued)

FOREIGN PATENT DOCUMENTS

EP 2 690 569 A1 1/2014

OTHER PUBLICATIONS

International Search Report and Written Opinion for International Application No. PCT/US2014/067930, dated Jun. 29, 2015.

*Primary Examiner* — Miranda Le
(74) *Attorney, Agent, or Firm* — Baker Botts L.L.P.

(57) ABSTRACT

In one embodiment, a method includes receiving, from a client device of a first user of an online social network, a search query associated with a first topic. The method also includes identifying one or more key-authors associated with the first topic. The method further includes retrieving multiple objects of the online social network matching the search query, where one or more of the retrieved objects are associated with the first topic and are authored by at least one of the identified key-authors. The method also includes generating multiple search-results modules, each search-result module including references to one or more of the retrieved objects. At least one of the search-results modules is a key-authors-module that includes references to one or more of the retrieved objects associated with the first topic that are authored by at least one of the identified key-authors.

40 Claims, 6 Drawing Sheets

(56) References Cited

U.S. PATENT DOCUMENTS

| | | | |
|---|---|---|---|
| 8,180,804 B1 | 5/2012 | Narayanan | |
| 8,185,558 B1 | 5/2012 | Narayanan | |
| 8,239,364 B2 | 8/2012 | Wable | |
| 8,244,848 B1 | 8/2012 | Narayanan | |
| 8,271,471 B1 | 9/2012 | Kamvar | |
| 8,271,546 B2 | 9/2012 | Gibbs | |
| 8,291,492 B2* | 10/2012 | McNally | G06Q 10/063 705/14.2 |
| 8,301,639 B1 | 10/2012 | Myllymaki | |
| 8,306,922 B1* | 11/2012 | Kunal | G06Q 30/02 705/319 |
| 8,321,364 B1 | 11/2012 | Gharpure | |
| 8,364,709 B1 | 1/2013 | Das | |
| 8,386,465 B2 | 2/2013 | Ansari | |
| 8,407,200 B2 | 3/2013 | Wable | |
| 8,412,749 B2 | 4/2013 | Fortuna | |
| 8,538,960 B2 | 9/2013 | Wong | |
| 8,572,129 B1 | 10/2013 | Lee | |
| 8,595,297 B2 | 11/2013 | Marcucci | |
| 8,601,027 B2 | 12/2013 | Behforooz | |
| 8,639,725 B1 | 1/2014 | Udeshi | |
| 8,732,208 B2 | 5/2014 | Lee | |
| 8,751,521 B2 | 6/2014 | Lee | |
| 8,782,080 B2 | 7/2014 | Lee | |
| 8,868,558 B2* | 10/2014 | Blanco | G06F 17/30867 707/736 |
| 8,868,603 B2 | 10/2014 | Lee | |
| 8,892,549 B1* | 11/2014 | Thakur | G06F 17/30657 707/728 |
| 8,990,200 B1* | 3/2015 | Christensen | G06F 17/30528 707/723 |
| 9,183,172 B1* | 11/2015 | Anderson | H04N 21/4788 |
| 9,244,985 B1* | 1/2016 | Haugen | G06F 17/30864 |
| 9,449,050 B1* | 9/2016 | Molina | G06F 17/3053 |
| 9,552,422 B2* | 1/2017 | Kasterstein | G06F 17/30684 |
| 2002/0086676 A1 | 7/2002 | Hendrey | |
| 2002/0196273 A1 | 12/2002 | Krause | |
| 2003/0154194 A1 | 8/2003 | Jonas | |
| 2003/0208474 A1 | 11/2003 | Soulanille | |
| 2004/0088325 A1 | 5/2004 | Elder | |
| 2004/0172237 A1 | 9/2004 | Saldanha | |
| 2004/0215793 A1 | 10/2004 | Ryan | |
| 2004/0255237 A1 | 12/2004 | Tong | |
| 2005/0091202 A1 | 4/2005 | Thomas | |
| 2005/0125408 A1 | 6/2005 | Somaroo | |
| 2005/0131872 A1 | 6/2005 | Calbucci | |
| 2005/0171955 A1 | 8/2005 | Hull | |
| 2005/0256756 A1 | 11/2005 | Lam | |
| 2006/0136419 A1 | 6/2006 | Brydon | |
| 2006/0190436 A1 | 8/2006 | Richardson | |
| 2006/0287988 A1* | 12/2006 | Mason | G06F 17/30737 |
| 2007/0277100 A1 | 11/2007 | Sheha | |
| 2008/0033926 A1 | 2/2008 | Matthews | |
| 2008/0072180 A1 | 3/2008 | Chevalier | |
| 2008/0183694 A1 | 7/2008 | Cane | |
| 2008/0183695 A1 | 7/2008 | Jadhav | |
| 2008/0228720 A1* | 9/2008 | Mukherjee | G06F 17/30672 |
| 2008/0270615 A1 | 10/2008 | Centola | |
| 2009/0006543 A1 | 1/2009 | Smit | |
| 2009/0094200 A1 | 4/2009 | Baeza-Yates | |
| 2009/0157667 A1* | 6/2009 | Brougher | G06Q 10/063 |
| 2009/0164929 A1 | 6/2009 | Chen | |
| 2009/0197681 A1 | 8/2009 | Krishnamoorthy | |
| 2009/0228296 A1 | 9/2009 | Ismalon | |
| 2009/0248669 A1* | 10/2009 | Shetti | G06F 17/3064 |
| 2009/0265326 A1* | 10/2009 | Lehrman | G06F 17/30867 |
| 2009/0281988 A1 | 11/2009 | Yoo | |
| 2009/0299963 A1 | 12/2009 | Pippori | |
| 2010/0049802 A1 | 2/2010 | Raman | |
| 2010/0057723 A1 | 3/2010 | Rajaram | |
| 2010/0125562 A1 | 5/2010 | Nair | |
| 2010/0179929 A1 | 7/2010 | Yin | |
| 2010/0191686 A1* | 7/2010 | Wang | G06F 17/30634 706/46 |
| 2010/0197318 A1 | 8/2010 | Petersen | |
| 2010/0228744 A1 | 9/2010 | Craswell | |
| 2010/0235354 A1 | 9/2010 | Gargaro | |
| 2010/0250526 A1* | 9/2010 | Prochazka | G06F 17/30672 707/723 |
| 2010/0318571 A1* | 12/2010 | Pearlman | H04L 63/104 707/784 |
| 2010/0321399 A1 | 12/2010 | Ellren | |
| 2011/0022602 A1 | 1/2011 | Luo | |
| 2011/0078166 A1 | 3/2011 | Oliver | |
| 2011/0087534 A1 | 4/2011 | Strebinger | |
| 2011/0137902 A1* | 6/2011 | Wable | G06F 17/30867 707/737 |
| 2011/0191371 A1 | 8/2011 | Elliott | |
| 2011/0191416 A1* | 8/2011 | Glazer | G06Q 10/06 709/204 |
| 2011/0196855 A1 | 8/2011 | Wable | |
| 2011/0202537 A1* | 8/2011 | Shamma | G06F 17/3082 707/741 |
| 2011/0270678 A1* | 11/2011 | Drummond | G06Q 30/02 705/14.52 |
| 2011/0276396 A1 | 11/2011 | Rathod | |
| 2011/0313992 A1 | 12/2011 | Groeneveld | |
| 2012/0011432 A1* | 1/2012 | Strutton | G06Q 30/02 715/234 |
| 2012/0041953 A1* | 2/2012 | Dumais | G06F 17/30707 707/739 |
| 2012/0059708 A1 | 3/2012 | Galas | |
| 2012/0136852 A1 | 5/2012 | Geller | |
| 2012/0166432 A1 | 6/2012 | Tseng | |
| 2012/0166433 A1 | 6/2012 | Tseng | |
| 2012/0179637 A1 | 7/2012 | Juan | |
| 2012/0185486 A1 | 7/2012 | Voigt | |
| 2012/0221581 A1 | 8/2012 | Narayanan | |
| 2012/0271831 A1 | 10/2012 | Narayanan | |
| 2012/0278127 A1 | 11/2012 | Kirakosyan | |
| 2012/0284329 A1 | 11/2012 | Van Den Oord | |
| 2012/0311034 A1 | 12/2012 | Goldband | |
| 2012/0331063 A1 | 12/2012 | Rajaram | |
| 2012/0331064 A1* | 12/2012 | Deeter | G06Q 50/01 709/206 |
| 2013/0031106 A1 | 1/2013 | Schechter | |
| 2013/0041876 A1 | 2/2013 | Dow | |
| 2013/0066876 A1 | 3/2013 | Raskino | |
| 2013/0086057 A1* | 4/2013 | Harrington | G06F 17/30864 707/732 |
| 2013/0124437 A1* | 5/2013 | Pennacchiotti | G06Q 30/0255 706/12 |
| 2013/0124538 A1 | 5/2013 | Lee | |
| 2013/0124542 A1 | 5/2013 | Lee | |
| 2013/0144899 A1 | 6/2013 | Lee | |
| 2013/0191372 A1 | 7/2013 | Lee | |
| 2013/0191416 A1 | 7/2013 | Lee | |
| 2013/0226918 A1 | 8/2013 | Berkhim | |
| 2013/0238600 A1* | 9/2013 | Kindler | G06F 17/30958 707/722 |
| 2013/0246404 A1 | 9/2013 | Annau | |
| 2014/0025673 A1 | 1/2014 | Sinha | |
| 2014/0025702 A1* | 1/2014 | Curtiss | G06Q 50/01 707/769 |
| 2014/0129537 A1* | 5/2014 | Spio | G06F 17/30699 707/706 |
| 2014/0136546 A1 | 5/2014 | Satalkar | |
| 2014/0214818 A1 | 7/2014 | Du | |
| 2014/0258276 A1* | 9/2014 | Fredinburg | G06F 17/30867 707/723 |
| 2014/0282904 A1* | 9/2014 | Brunn | H04L 67/22 726/4 |
| 2014/0304249 A1* | 10/2014 | Ayzenshtat | G06F 17/3053 707/709 |
| 2015/0012524 A1* | 1/2015 | Heymans | G06F 17/30424 707/722 |
| 2015/0127653 A1* | 5/2015 | Keng | G06F 17/30598 707/740 |

* cited by examiner

SEARCHING FOR CONTENT BY KEY-AUTHORS ON ONLINE SOCIAL NETWORKS

TECHNICAL FIELD

This disclosure generally relates to online social networks, and in particular to performing searches for objects within a social-networking environment.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

Social-graph analysis views social relationships in terms of network theory consisting of nodes and edges. Nodes represent the individual actors within the networks, and edges represent the relationships between the actors. The resulting graph-based structures are often very complex. There can be many types of nodes and many types of edges for connecting nodes. In its simplest form, a social graph is a map of all of the relevant edges between all the nodes being studied.

SUMMARY OF PARTICULAR EMBODIMENTS

In particular embodiments, a social-networking system may receive a search query from a user of an online social network, and in response to the search query, the social-networking system may search for content by key-authors on the online social network. The user's search query may be associated with a particular topic (e.g., the search query "messi soccer" may be associated with the topic "Lionel Messi"), and the social-networking system may identify key-authors associated with the topic. A key-author for a particular topic may refer to a person who is particularly relevant to, associated with, or knowledgeable about that topic. For example, actor William Shatner (best known for his role as Captain Kirk in the television and movie series of Star Trek) may be identified as a key-author associated with the topic "Star Trek." In particular embodiments, there may be various types of key-authors associated with a particular topic, such as for example, subject-authors (e.g., a person referenced in one or more objects associated with the topic); expert-authors (e.g., a person who is knowledgeable about the topic); journalists (e.g., a reporter who has written articles about the topic); derivative-expert-authors (e.g., a person whose posts on the topic have received comments from expert-authors); eyewitness-authors (e.g., a person whose posts on the topic match a timeframe and location associated with the topic); and indirect-subject-authors (e.g., a person who is within a threshold degree of separation of a subject-author within the social graph).

Key-authors associated with a particular topic may be identified by crawling third-party systems (e.g., online indexes, databases, or news sources) to gather candidate key-author names associated with the topic. Additionally, key-authors may be identified by extracting candidate key-author names from objects in the online social network associated with the topic. In particular embodiments, an author-score may be determined for each identified key-author, where the author-score may be based at least in part on the relevance of the key-author to the topic. Objects by particular key-authors (e.g., posts by key-authors having an author-score above a particular threshold author-score) that are associated with the particular topic may be retrieved from the online social network. An object score for each of the retrieved objects may be determined, where the object score may be based at least in part on a relevance of the object to the search query or the topic.

In particular embodiments, after retrieving objects of the online social network that match a search query, multiple search-results modules may be generated, where each search-result module includes references to one or more of the retrieved objects. The search-results modules may include one or more key-authors-modules with references to retrieved objects associated with the particular topic that are authored by key-authors. In particular embodiments, each reference in a key-authors-module may correspond to a retrieved object having an object score greater than a threshold object score. The social-networking system may send, to a client device of a querying user, a search-results page responsive to the search query. The search-results page may include a key-authors-module along with other search-results modules.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

System Overview

Figure 1:
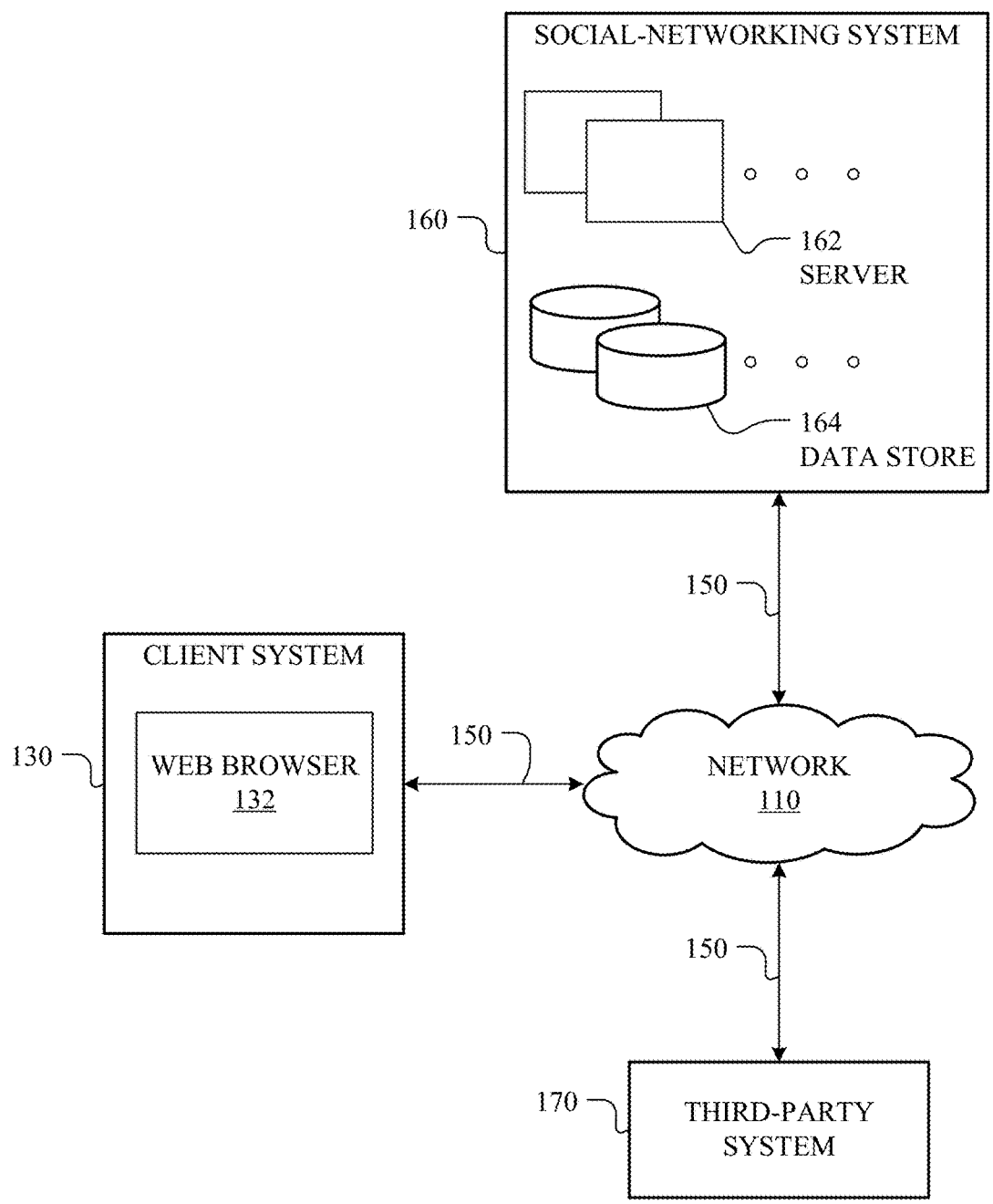
FIG. 1 illustrates an example network environment associated with a social-networking system.

FIG. 1 illustrates an example network environment 100 associated with a social-networking system. Network environment 100 includes client system 130, social-networking system 160, and third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. Client system 130 may enable a network user at client system 130 to access network 110. Client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. As an example and not by way of limitation, client system 130 may access social-networking system 160 using a web browser 132, or a native application associated with social-networking system 160 (e.g., a mobile social-networking application, a messaging application, another suitable application, or any combination thereof) either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (i.e., relationships) to a number of other users of social-networking system 160 whom they want to be connected to. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, third-party system 170 may include a third-party content object provider. A third-party content object provider may include one or more sources of content objects, which may be communicated to client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, ad-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to client system 130. Information may be pushed to client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in or opt out of having their actions logged by social-networking system 160 or shared with other systems (e.g., third-party system 170), such as, for example, by setting appropriate privacy settings. Third-party-content-object stores may be used to store content objects received from third parties, such as third-party system 170. Location stores may be used for storing location information received from client systems 130 associated with users. Advertisement-pricing modules may combine social information, the current time, location information, or other suitable information to provide relevant advertisements, in the form of notifications, to a user.

Social Graphs

Figure 2:
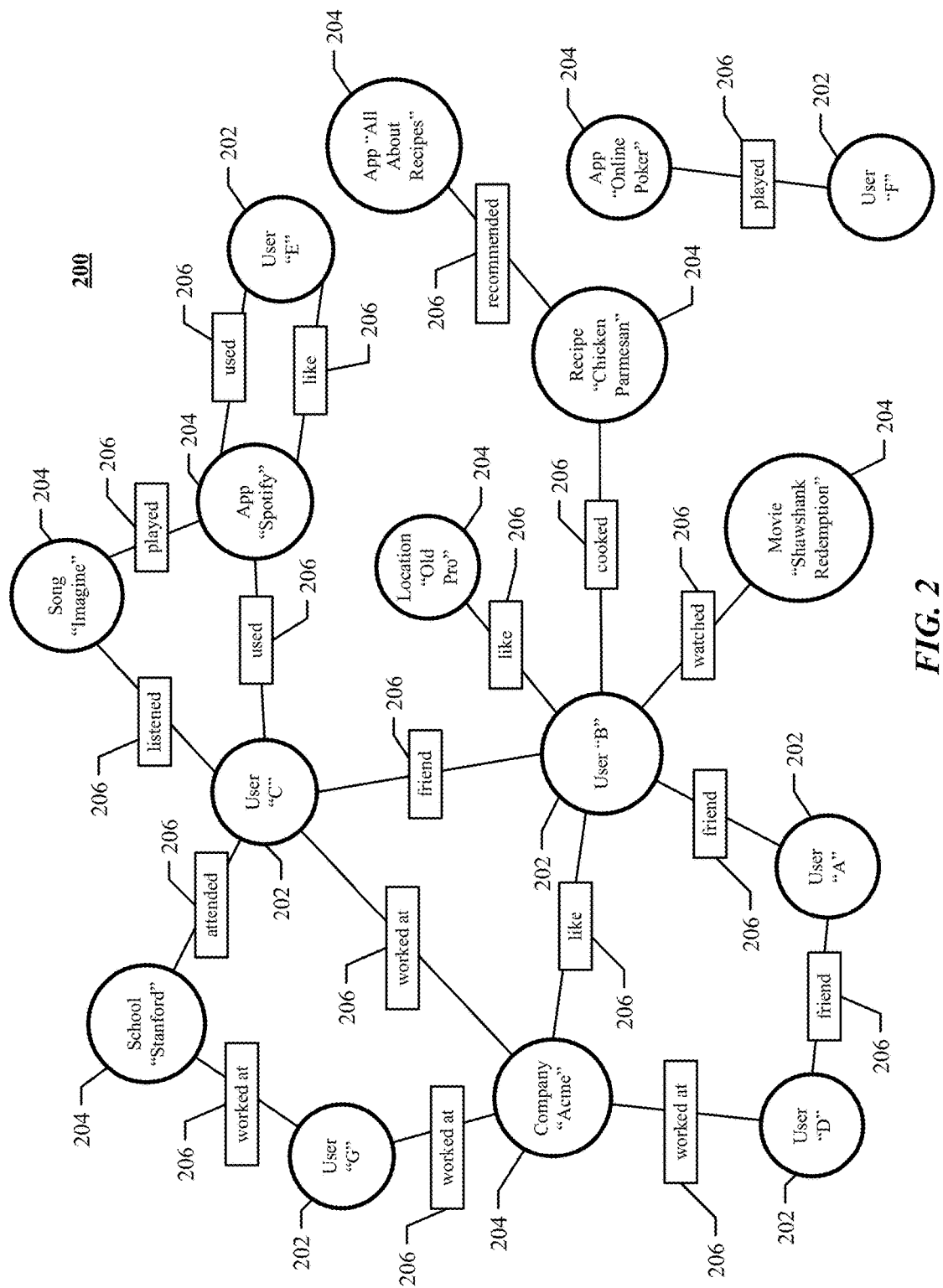
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-networking system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing client system 130 to send to social-networking system 160 a message indicating the user's action. In response to the message, social-networking system 160 may create an edge (e.g., an "eat" edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more data stores 24. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in par-

Typeahead Processes and Search Queries

In particular embodiments, one or more client-side and/or backend (server-side) processes may implement and utilize a "typeahead" feature that may automatically attempt to match social-graph elements (e.g., user nodes 202, concept nodes 204, or edges 206) to information currently being entered by a user in an input form rendered in conjunction with a requested webpage (such as, for example, a user-profile page, a concept-profile page, a search-results webpage, or another suitable page of the online social network), which may be hosted by or accessible in social-networking system 160. In particular embodiments, as a user is entering text to make a declaration, the typeahead feature may attempt to match the string of textual characters being entered in the declaration to strings of characters (e.g., names, descriptions) corresponding to user, concepts, or edges and their corresponding elements in the social graph 200. In particular embodiments, when a match is found, the typeahead feature may automatically populate the form with a reference to the social-graph element (such as, for example, the node name/type, node ID, edge name/type, edge ID, or another suitable reference or identifier) of the existing social-graph element.

In particular embodiments, as a user types or otherwise enters text into a form used to add content or make declarations in various sections of the user's profile page, home page, or other page, the typeahead process may work in conjunction with one or more frontend (client-side) and/or backend (server-side) typeahead processes (hereinafter referred to simply as "typeahead process") executing at (or within) social-networking system 160 (e.g., within servers 162), to interactively and virtually instantaneously (as appearing to the user) attempt to auto-populate the form with a term or terms corresponding to names of existing social-graph elements, or terms associated with existing social-graph elements, determined to be the most relevant or best match to the characters of text entered by the user as the user enters the characters of text. Utilizing the social-graph information in a social-graph database or information extracted and indexed from the social-graph database, including information associated with nodes and edges, the typeahead processes, in conjunction with the information from the social-graph database, as well as potentially in conjunction with various others processes, applications, or databases located within or executing within social-networking system 160, may be able to predict a user's intended declaration with a high degree of precision. However, social-networking system 160 can also provide users with the freedom to enter essentially any declaration they wish, enabling users to express themselves freely.

In particular embodiments, as a user enters text characters into a form box or other field, the typeahead processes may attempt to identify existing social-graph elements (e.g., user nodes 202, concept nodes 204, or edges 206) that match the string of characters entered in the user's declaration as the user is entering the characters. In particular embodiments, as the user enters characters into a form box, the typeahead process may read the string of entered textual characters. As each keystroke is made, the frontend-typeahead process may send the entered character string as a request (or call) to the backend-typeahead process executing within social-networking system 160. In particular embodiments, the typeahead processes may communicate via AJAX (Asynchronous JavaScript and XML) or other suitable techniques, and particularly, asynchronous techniques. In particular embodiments, the request may be, or comprise, an XMLHTTPRequest (XHR) enabling quick and dynamic sending and fetching of results. In particular embodiments, the typeahead process may also send before, after, or with the request a section identifier (section ID) that identifies the particular section of the particular page in which the user is making the declaration. In particular embodiments, a user ID parameter may also be sent, but this may be unnecessary in some embodiments, as the user may already be "known" based on the user having logged into (or otherwise been authenticated by) social-networking system 160.

In particular embodiments, the typeahead process may use one or more matching algorithms to attempt to identify matching social-graph elements. In particular embodiments, when a match or matches are found, the typeahead process may send a response (which may utilize AJAX or other suitable techniques) to the user's client system 130 that may include, for example, the names (name strings) or descriptions of the matching social-graph elements as well as, potentially, other metadata associated with the matching social-graph elements. As an example and not by way of limitation, if a user entering the characters "pok" into a query field, the typeahead process may display a drop-down menu that displays names of matching existing profile pages and respective user nodes 202 or concept nodes 204, such as a profile page named or devoted to "poker" or "pokemon", which the user can then click on or otherwise select thereby confirming the desire to declare the matched user or concept name corresponding to the selected node. As another example and not by way of limitation, upon clicking "poker," the typeahead process may auto-populate, or causes the web browser 132 to auto-populate, the query field with the declaration "poker". In particular embodiments, the typeahead process may simply auto-populate the field with the name or other identifier of the top-ranked match rather than display a drop-down menu. The user may then confirm the auto-populated declaration simply by keying "enter" on his or her keyboard or by clicking on the auto-populated declaration.

More information on typeahead processes may be found in U.S. patent application Ser. No. 12/763,162, filed 19 Apr. 2010, and U.S. patent application Ser. No. 13/556,072, filed 23 Jul. 2012, each of which is incorporated by reference.

Figure 3:
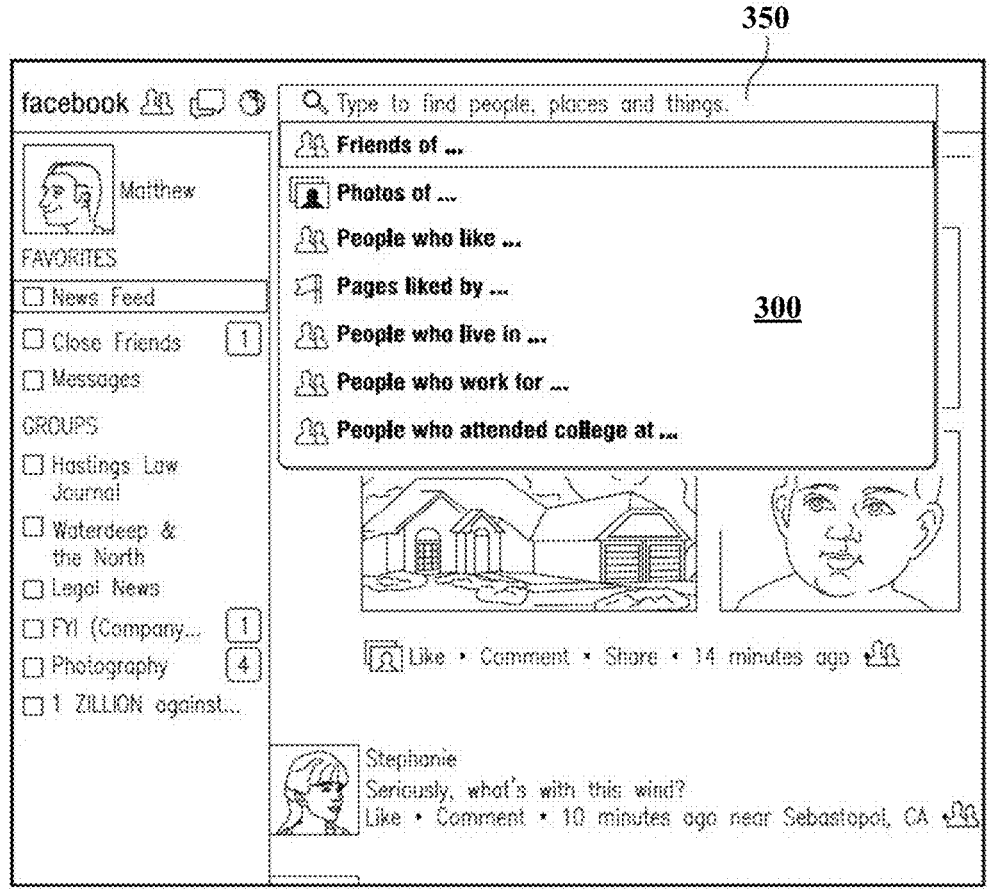
FIG. 3 illustrates an example webpage of an online social network.

FIG. 3 illustrates an example webpage of an online social network. In particular embodiments, a user may submit a query to the social-network system 160 by inputting text into query field 350. A user of an online social network may search for information relating to a particular topic or specific subject matter (e.g., users, concepts, external content or resource) by providing a short phrase describing the topic or subject matter, often referred to as a "search query," to a search engine. The query may be an unstructured text query and may comprise one or more text strings (which may include one or more n-grams). In general, a user may input any character string into query field 350 to search for content on social-networking system 160 that matches the text query. Social-networking system 160 may then search a data store 164 (or, in particular, a social-graph database) to identify content matching the query. The search engine may conduct a search based on the query phrase using various search algorithms and generate search results that identify resources or content (e.g., user-profile pages, content-profile pages, or external resources) that are most likely to be related to the search query. To conduct a search, a user may input or send a search query to the search engine. In response, the search engine may identify one or more resources that are likely to be related to the search query, each of which may individually be referred to as a "search result," or collectively be referred to as the "search results" corresponding to the search query. The identified content may include, for example, social-graph elements (i.e., user nodes 202, concept nodes 204, edges 206), profile pages, external webpages, or any combination thereof. Social-networking system 160 may then generate a search-results webpage with search results corresponding to the identified content and send the search-results webpage to the user. In particular embodiments, the search engine may limit its search to resources and content on the online social network. However, in particular embodiments, the search engine may also search for resources or contents on other sources, such as third-party system 170, the internet or World Wide Web, or other suitable sources. Although this disclosure describes querying social-networking system 160 in a particular manner, this disclosure contemplates querying social-networking system 160 in any suitable manner.

In particular embodiments, the typeahead processes described herein may be applied to search queries entered by a user. As an example and not by way of limitation, as a user enters text characters into a query field 350, a typeahead process may attempt to identify one or more user nodes 202, concept nodes 204, or edges 206 that match the string of characters entered into the query filed 350 as the user is entering the characters. As the typeahead process receives requests or calls including a string or n-gram from the text query, the typeahead process may perform or cause to be performed a search to identify existing social-graph elements (i.e., user nodes 202, concept nodes 204, edges 206) having respective names, types, categories, or other identifiers matching the entered text. The typeahead process may use one or more matching algorithms to attempt to identify matching nodes or edges. When a match or matches are found, the typeahead process may send a response to the user's client system 130 that may include, for example, the names (name strings) of the matching nodes as well as, potentially, other metadata associated with the matching nodes. The typeahead process may then display a drop-down menu 300 that displays references to the matching profile pages (e.g., a name or photo associated with the page) of the respective user nodes 202 or concept nodes 204, and displays names of matching edges 206 that may connect to the matching user nodes 202 or concept nodes 204, which the user can then click on or otherwise select, thereby confirming the desire to search for the matched user or concept name corresponding to the selected node, or to search for users or concepts connected to the matched users or concepts by the matching edges. Alternatively, the typeahead process may simply auto-populate the form with the name or other identifier of the top-ranked match rather than display a drop-down menu 300. The user may then confirm the auto-populated declaration simply by keying "enter" on a keyboard or by clicking on the auto-populated declaration. Upon user confirmation of the matching nodes and/or edges, the typeahead process may send a request that informs social-networking system 160 of the user's confirmation of a query containing the matching social-graph elements. In response to the sent request, social-networking system 160 may automatically (or alternately based on an instruction in the request) call or otherwise search a social-graph database for the matching social-graph elements, or for social-graph elements connected to the matching social-graph elements as appropriate. Although this disclosure describes applying the typeahead processes to search queries in a particular manner, this disclosure contemplates applying the typeahead processes to search queries in any suitable manner.

In connection with search queries and search results, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, and U.S. patent application Ser. No. 12/978,265, filed 23 Dec. 2010, each of which is incorporated by reference.

Figure 4:
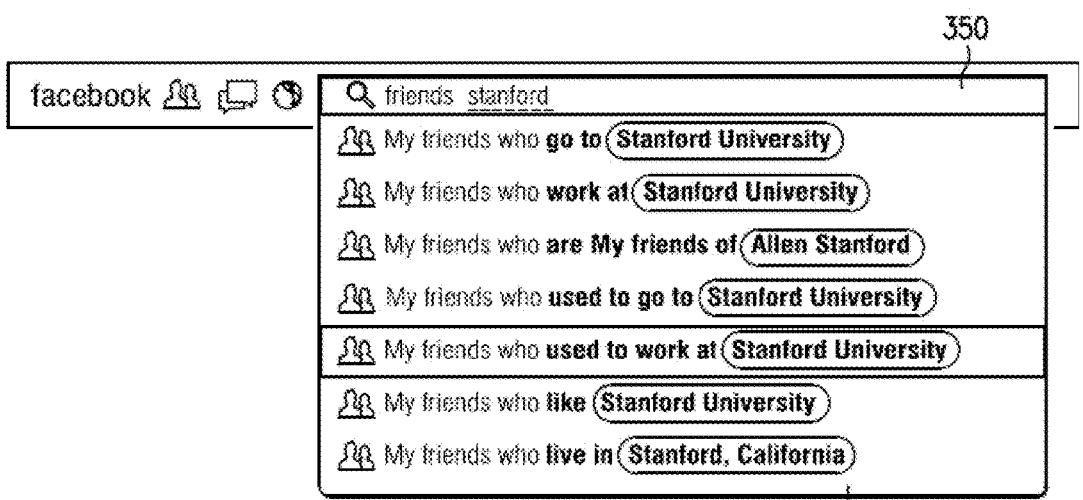
FIG. 4 illustrates an example query of the online social network.

FIG. 4 illustrates an example query of the online social network. In particular embodiments, in response to a text query received from a first user (i.e., the querying user), social-networking system 160 may parse the text query and identify portions of the text query that correspond to particular social-graph elements. Social-networking system 160 may then generate a set of structured queries, where each structured query corresponds to one of the possible matching social-graph elements. These structured queries may be based on strings generated by a grammar model, such that they are rendered in a natural-language syntax with references to the relevant social-graph elements. These structured queries may be presented to the querying user, who can then select among the structured queries to indicate that the selected structured query should be run by social-networking system 160. FIG. 4 illustrates various example text queries in query field 350 and various structured queries generated in response in drop-down menus 300 (although other suitable graphical user interfaces are possible). By providing suggested structured queries in response to a user's text query, social-networking system 160 may provide a powerful way for users of the online social network to search for elements represented in the social graph 200 based on their social-graph attributes and their relation to various social-graph elements. Structured queries may allow a querying user to search for content that is connected to particular users or concepts in the social graph 200 by particular edge-types. The structured queries may be sent to the first user and displayed in a drop-down menu 300 (via, for example, a client-side typeahead process), where the first user can then select an appropriate query to search for the desired content. Some of the advantages of using the structured queries described herein include finding users of the online social network based upon limited information, bringing together virtual indexes of content from the online social network based on the relation of that content to various social-graph elements, or finding content related to you and/or your friends. Although this disclosure describes and FIG. 4 illustrates generating particular structured queries in a particular manner, this disclosure contemplates generating any suitable structured queries in any suitable manner.

In particular embodiments, social-networking system 160 may receive from a querying/first user (corresponding to a first user node 202) an unstructured text query. As an example and not by way of limitation, a first user may want to search for other users who: (1) are first-degree friends of the first user; and (2) are associated with Stanford University (i.e., the user nodes 202 are connected by an edge 206 to the concept node 204 corresponding to the school "Stanford"). The first user may then enter a text query "friends stanford" into query field 350, as illustrated in FIG. 4. As the querying user enters this text query into query field 350, social-networking system 160 may provide various suggested structured queries, as illustrated in drop-down menus 300. As used herein, an unstructured text query refers to a simple text string inputted by a user. The text query may, of course, be structured with respect to standard language/grammar rules (e.g. English language grammar). However, the text query will ordinarily be unstructured with respect to social-graph elements. In other words, a simple text query will not ordinarily include embedded references to particular social-graph elements. Thus, as used herein, a structured query refers to a query that contains references to particular social-graph elements, allowing the search engine to search based on the identified elements. Furthermore, the text query may be unstructured with respect to formal query syntax. In other words, a simple text query will not necessarily be in the format of a query command that is directly executable by a search engine (e.g., the text query "friends stanford" could be parsed to form the query command "intersect(school (Stanford University), friends(me)", which could be executed as a query in a social-graph database). Although this disclosure describes receiving particular queries in a particular manner, this disclosure contemplates receiving any suitable queries in any suitable manner.

In particular embodiments, social-networking system 160 may parse the unstructured text query (also simply referred to as a search query) received from the first user (i.e., the querying user) to identify one or more n-grams. In general, an n-gram is a contiguous sequence of n items from a given sequence of text or speech. The items may be characters, phonemes, syllables, letters, words, base pairs, prefixes, or other identifiable items from the sequence of text or speech. The n-gram may comprise one or more characters of text (letters, numbers, punctuation, etc.) entered by the querying user. An n-gram of size one can be referred to as a "unigram," of size two can be referred to as a "bigram" or "digram," of size three can be referred to as a "trigram," and so on. Each n-gram may include one or more parts from the text query received from the querying user. In particular embodiments, each n-gram may comprise a character string (e.g., one or more characters of text) entered by the first user. As an example and not by way of limitation, social-networking system 160 may parse the text query "friends stanford" to identify the following n-grams: friends; stanford; friends stanford. As another example and not by way of limitation, social-networking system 160 may parse the text query "friends in palo alto" to identify the following n-grams: friends; in; palo; alto; friends in; in palo; palo alto; friend in palo; in palo alto; friends in palo alto. In particular embodiments, each n-gram may comprise a contiguous sequence of n items from the text query. Although this disclosure describes parsing particular queries in a particular manner, this disclosure contemplates parsing any suitable queries in any suitable manner.

In connection with element detection and parsing search queries, particular embodiments may utilize one or more systems, components, elements, functions, methods, operations, or steps disclosed in U.S. patent application Ser. No. 13/556,072, filed 23 Jul. 2012, U.S. patent application Ser. No. 13/732,101, filed 31 Dec. 2012, each of which is incorporated by reference.

Identifying Key-Authors

In particular embodiments, social-networking system 160 may receive, from a client device of a user of an online social network, a search query associated with a particular topic. As an example and not by way of limitation, a user searching for information about the topic "Nobel Peace Prize" may submit the search query "nobel prize" or "peace prize" to social-networking system 160. As another example and not by way of limitation, a user searching for information about the topic "Lionel Messi," a soccer player for Futbol Club Barcelona, may submit the search query "leo messi," "messi soccer," or "messi barcelona" to social-networking system 160. In particular embodiments, a topic may refer to a title, description, name, or any other suitable descriptor or identifier corresponding to a particular event or subject matter. A topic may refer to any suitable event or any suitable subject matter, such as for example, a news event (e.g., 2016 United States presidential election), a sporting event (e.g., 2014 World Cup), an organization (e.g., Nobel Peace Prize nominating committee), a place (e.g., Yosemite National Park), a person (e.g., Lionel Messi), a product (e.g., iPhone 6), or a restaurant (e.g., Sancho's Taqueria). Although this disclosure describes particular search queries associated with particular topics, this disclosure contemplates any suitable search queries associated with any suitable topics.

In particular embodiments, social-networking system 160 may determine a topic that a search query is associated with by analyzing the text of the search query. A user may enter a search query, and in response, social-networking system 160 may identify one or more topics that are likely to be related to the search query. In particular embodiments, social-networking system 160 may maintain a database of topics along with a list of keywords, terms, or characters determined to be associated with or the most relevant to each topic. In particular embodiments, topics and keywords associated with respective topics may be determined, at least in part, by analysis of information in a social-graph database or information extracted and indexed from the social-graph database. As an example and not by way of limitation, social-networking system 160 may identify topics and keywords from analysis of existing social-graph elements (e.g., user nodes 202, concept nodes 204, or edges 206). In particular embodiments, topics and keywords associated with respective topics may be determined, at least in part, by extracting information from one or more third-party systems 170. As an example and not by way of limitation, social-networking system 160 may crawl an online index, database, or news source (e.g. WIKIPEDIA.org, BBC.com, CNN.com, or NYTIMES.com) to gather topics and associated keywords. In response to receiving a search query, social-networking system 160 may determine a topic associated with the search query by parsing the search query and finding a match between characters or words entered as the search query and keywords in a topic database. In particular embodiments, a topic database may include a list of topics with one or more associated keywords for each topic. A topic database may be assembled by social-networking system 160, and periodically, social-networking system 160 may maintain the topic database by adding new topics (e.g., adding a topic for a recent news story), revising existing topics (e.g., updating keywords associated with a particular topic), or removing old or obsolete topics. In particular embodiments, social-networking system 160 may employ one or more matching algorithms to find a match between a search query and keywords associated with a topic. When a match is found between a search query and a particular topic, social-networking system 160 may associate the search query with that particular topic. In particular embodiments, a search query may be determined to be associated with a single topic. As an example and not by way of limitation, the search query "donkey kong" may be determined to be associated with the video game Donkey Kong. In particular embodiments, a search query may be determined to be associated with two or more topics. As an example and not by way of limitation, the search query "messi barcelona" may be determined to be associated with the topics "Lionel Messi" and "Futbol Club Barcelona." Although this disclosure describes determining topics associated with search queries in a particular manner, this disclosure contemplates determining a topic associated with a search query in any suitable manner.

In particular embodiments, social-networking system 160 may identify one or more key-authors associated with a topic. As an example and not by way of limitation, in response to receiving a search query associated with a particular topic, social-networking system 160 may identify key-authors who are associated with that particular topic. In particular embodiments, a key-author for a particular topic may refer to a person who is relevant to, associated with, or knowledgeable about that topic. As an example and not by way of limitation, actor William Shatner may be a key-author associated with the topic "Star Trek." In particular embodiments, a topic may have multiple key-authors associated with it. As an example and not by way of limitation, each of the members of a rock band may be key-authors associated with the band (e.g., John Lennon, Paul McCartney, George Harrison, and Ringo Starr may each be key-authors associated with the topic "the Beatles"). In particular embodiments, a key-author may be associated with multiple topics. As an example and not by way of limitation, comedian and banjo-player Steve Martin may be a key-author associated with the topic "comedy," and Steve Martin may also be a key-author associated with the topic "banjo." In particular embodiments, a key-author associated with a particular topic may also be a topic. As an example and not by way of limitation, soccer player Lionel Messi may be a key-author associated with the topic "Futbol Club Barcelona," and Lionel Messi himself may also be a topic. As another example and not by way of limitation, First Lady Michelle Obama may be a key-author associated with the topic "Barack Obama," and conversely, President Barack Obama may be a key-author associated with the topic "Michelle Obama." Although this disclosure describes particular key-authors associated with particular topics, this disclosure contemplates any suitable key-authors associated with any suitable topics.

In particular embodiments, key-authors may include one or more subject-authors, where a subject-author is a person referenced in one or more objects associated with the particular topic. As an example and not by way of limitation, a subject-author may include a person who is directly associated with a particular topic (e.g., the person may be mentioned in a news article about the topic). In particular embodiments, a subject-author may be a person who has their name or image included in an object associated with a particular topic. As an example and not by way of limitation, Malala Yousafzai, a 2014 Nobel Peace Prize recipient, is mentioned in news stories about the 2014 Nobel Peace Prize, and so she may be identified as a subject-author associated with the topic "2014 Nobel Peace Prize." As another example and not by way of limitation, Lionel Messi may be identified as a subject-author associated with the topic "Futbol Club Barcelona," since his name is mentioned or his picture is included in news stories or articles about Futbol Club Barcelona. In particular embodiments, objects that reference a subject-author may include posts, comments, news stories, articles, photographs, videos, audio files, text files, web pages, books, other suitable object-types, or any suitable combination thereof. As an example and not by way of limitation, the topic "the Beatles" may be associated various objects (e.g., news stories, articles, or photographs) that include the names of subject-authors John Lennon, Paul McCartney, George Harrison, or Ringo Starr. In particular embodiments, a subject-author may be identified based on a number of objects in which their name or photo appears. As an example and not by way of limitation, social-networking system 160 may identify a person as a subject-author for a particular topic if that person has been mentioned in greater than a threshold number of objects about the topic (e.g., greater than 10, 20, 30, 50, or 100 posts, comments, news stories, or articles about the topic). Although this disclosure describes particular subject-authors determined in particular manners, this disclosure contemplates any suitable subject-authors determined in any suitable manner.

In particular embodiments, key-authors may include one or more expert-authors. In particular embodiments, an expert-author may be a person recognized as being knowledgeable about, or an expert in, a particular topic. As an example and not by way of limitation, a person who is an expert-author with respect to a particular topic may be a person who frequently authors objects (e.g., posts, comments, news stories, articles, etc.) associated with the topic. As another example and not by way of limitation, a blogger who writes a blog related to a particular topic may be identified as an expert-author with respect to that topic. In particular embodiments, an expert-author may be a person with a certain threshold level of engagement or an author of greater than a threshold number or threshold frequency of objects associated with the particular topic. As an example and not by way of limitation, social-networking system 160 may identify as an expert-author a person who has authored greater than a threshold number of objects (e.g., greater than 10, 20, 30, 50, or 100 posts, comments, news stories, or articles, or greater than any suitable number of objects). As another example and not by way of limitation, a person whose objects associated with a particular topic have received greater than a threshold number of feedback from other users (e.g., greater than a threshold number of comments or "likes") may be identified as an expert-author on that topic. As another example and not by way of limitation, a person who has authored objects on a particular topic with a frequency greater than a threshold frequency (e.g., greater than 1, 2, 3, 5, or 10 objects per week, or greater than any suitable number of objects per week) may be identified as an expert-author. In particular embodiments, an expert-author may be a person identified as an expert by an authoritative source. As an example and not by way of limitation, if a person's name occurs in an online index, database, or news source in connection with a particular topic, then that person may be identified as an expert-author with respect to that topic. In particular embodiments, an expert-author may be a person (e.g., a journalist, reporter, or columnist) who writes for or contributes articles to an authoritative source, where an authoritative source may refer to a publication (e.g., THE WALL STREET JOURNAL or THE NATION), a news network (e.g., CNN or BBC NEWS), or an online news or information source (e.g., SLATE MAGAZINE, CNN.com, or WSJ.com). As an example and not by way of limitation, Walt Mossberg may be identified as an expert-author with respect to various technology topics since he is a journalist who has written numerous articles related to technology for the authoritative source THE WALL STREET JOURNAL. In particular embodiments, an expert-author may not be a subject-author or may not be mentioned in an object associated with a particular topic. As an example and not by way of limitation, although not mentioned directly in an article about the 2014 Nobel Peace Prize, a member of the Nobel Peace Prize nominating committee (who may be determined from a list of committee members on WIKIPEDIA.org, NOBELPEACEPRIZE.org, or any other suitable online index) may be identified as an expert-author with respect to the topic "Nobel Peace Prize." In particular embodiments, a person may be identified as being both a subject-author and an expert-author with respect to a particular topic. As an example and not by way of limitation, Lionel Messi may be identified as a subject-author as well as an expert-author with respect to Futbol Club Barcelona. In particular embodiments, an expert-author may be determined based on multiple criteria. As an example and not by way of limitation, a person may be identified as an expert-author with respect to a particular topic if they have authored greater than a threshold number of objects on the topic and if their objects on the topic have received greater than a threshold number of feedback from other users. As another example and not by way of limitation, a person may be identified as an expert-author with respect to a particular topic if their name occurs in an online index in connection with the topic, if they have authored greater than a threshold number of objects on the topic, and if the objects they authored have received greater than a threshold number of "likes" from other users. Although this disclosure describes particular expert-authors determined in particular manners, this disclosure contemplates any suitable expert-authors determined in any suitable manner.

In particular embodiments, key-authors may include one or more journalists, each journalist being an author of multiple objects associated with a particular topic. As an example and not by way of limitation, a reporter who has written news stories on the Nobel Peace Prize may be identified as a journalist with respect to the topic "2014 Nobel Peace Prize." As another example and not by way of limitation, a journalist who has written greater than a threshold number of news articles on soccer may be identified as a journalist with respect to the topics "Lionel Messi" or "Futbol Club Barcelona." In particular embodiments, a person may be identified as a journalist with respect to multiple topics. As an example and not by way of limitation, a reporter who has authored multiple news stories or magazine articles on the middle east may be identified as a journalist with respect to multiple topics, such as for example, the topics "Iraq," "Syria," "Gaza," or "Israel." In particular embodiments, a person may be identified as being both a journalist and an expert-author with respect to a particular topic. As an example and not by way of limitation, a reporter who authors news stories as well as other objects (e.g., posts, comments, articles, books, or a blog) on a particular topic may be identified as a journalist as well as an expert-author with respect to the topic. In particular embodiments, a person who has authored one or more articles, columns, news stories, or opinion pieces on a particular topic for an authoritative source (e.g., THE WALL STREET JOURNAL, THE NATION, CNN, or BBC NEWS) may be identified as a journalist with respect to the topic. Although this disclosure describes particular journalists determined in particular manners, this disclosure contemplates any suitable journalists determined in any suitable manner.

In particular embodiments, key-authors may include one or more derivative-expert-authors. In particular embodiments, a derivative-expert-author may be a person who is identified as being knowledgeable about a particular topic by the engagement of an expert-author or a subject-author with objects authored by the person. As an example and not by way of limitation, if an identified expert-author on a particular topic frequently engages with objects (e.g., posts, comments, articles) written by another person, then the other person may be identified as a derivative-expert-author. In particular embodiments, a derivative-expert-author may be an author of one or more objects associated with a particular topic, where the objects have received greater than a threshold number of feedback (e.g., comments, replies, or "likes") from one or more expert-authors. As an example and not by way of limitation, if a soccer fan authors one or more posts about Futbol Club Barcelona that receive more than a threshold number of comments from an identified Futbol Club Barcelona expert-author or subject-author, then the fan may be identified as a derivative-expert-author with respect to Futbol Club Barcelona. Although this disclosure describes particular derivative-expert-authors determined in particular manners, this disclosure contemplates any suitable derivative-expert-authors determined in any suitable manner.

In particular embodiments, key-authors may include one or more eyewitness-authors. In particular embodiments, an eyewitness-author may be associated with a timeframe and a location that are also associated with a particular topic. An eyewitness-author may refer to a person who is at the location of an event at the same time when the event takes place. As an example and not by way of limitation, a person whose location is near the Maracanã Stadium in Rio de Janeiro, Brazil at a timeframe around 13 Jul. 2014 may be an eyewitness-author for the topic "2014 FIFA World Cup Final." In particular embodiments, an eyewitness-author for a particular event may refer to a person who is on the scene of the event. As an example and not by way of limitation, an eyewitness-author may be determined based on the person's location relative to the event and based on a time or relevance, with respect to the event, of one or more of the person's posts. In particular embodiments, social-networking system 160 may determine a timeframe and a location associated with a topic and then identify objects that match the timeframe, location, and topic. A person with one or more posts that match the timeframe, location, and topic criteria may be identified as an eyewitness-author for the topic. As an example and not by way of limitation, a person who writes one or more posts associated with global climate change and who is located near the United Nations Headquarters at a timeframe around 23 Sep. 2014 may be identified as an eyewitness-author for the topic "UN Climate Summit 2014." As another example and not by way of limitation, social-networking system 160 may determine that the topic "Hawaii lava flow" has a location near Pahoa, Hi. and a timeframe around November 2014. A person with the same timeframe and location (e.g., a person located near Pahoa, Hi. around November 2014) who has authored one or more objects associated with the topic "Hawaii lava flow" may be identified as an eyewitness-author for the "Hawaii lava flow" topic. Although this disclosure describes particular eyewitness-authors determined in particular manners, this disclosure contemplates any suitable eyewitness-authors determined in any suitable manner.

In particular embodiments, social-networking system 160 may access a social graph that includes multiple nodes and multiple edges connecting the nodes, each of the edges between two of the nodes representing a single degree of separation between them and each node corresponding to an object associated with the online social network. In particular embodiments, key-authors may include one or more indirect-subject-authors, each indirect-subject-author being within a threshold degree of separation of a subject-author within the social graph. In particular embodiments, an indirect-subject-author may be a person who is connected to a subject-author within a single degree of separation. As an example and not by way of limitation, 2014 Nobel Peace Prize recipient Malala Yousafzai may be identified as a subject-author associated with the topic "2014 Nobel Peace Prize." Additionally, Malala's father, Ziauddin Yousafzai, may be identified as an indirect-subject-author for the topic "2014 Nobel Peace Prize" since he may be connected to Malala through a first-degree connection within the social graph. As another example and not by way of limitation, First Lady Michelle Obama may be identified as an indirect-subject-author for a topic for which President Barack Obama is identified as a subject-author. In particular embodiments, an indirect-subject-author may be a person who is associated with or related to a particular topic or to another subject-author. As an example and not by way of limitation, a topic related to soccer player Lionel Messi may identify one or more other players for Futbol Club Barcelona as indirect-subject-authors, where the other players may be determined from a team roster on an online information source (e.g., the team website, FCBARCELONA.com, or an article about Futbol Club Barcelona on WIKIPEDIA.org). Although this disclosure describes particular indirect-subject-authors determined in particular manners, this disclosure contemplates any suitable indirect-subject-authors determined in any suitable manner.

In particular embodiments, social-networking system 160 may identify one or more key-authors associated with a particular topic by crawling a third-party system 170 to identify one or more objects associated with the topic and extracting one or more candidate key-author names from one or more of the identified objects. As an example and not by way of limitation, social-networking system 160 may crawl an online index, database, or news source (e.g. WIKIPEDIA.org, BBC.com, CNN.com, or NYTIMES.com) to gather candidate key-author names associated with a particular topic. In particular embodiments, crawling third-party system 170 may refer to a process for examining, copying, indexing, fetching, or searching for information on a webpage of third-party system 170. Crawling a third-party system may include identifying objects (e.g., posts, tags, articles, news stories, photographs, videos, or audio files) on the third-party system that include one or more particular text strings (e.g., a text string associated with a particular topic, such as for example "Nobel Peace Prize" or "peace prize"). Once an object is identified as having one or more text strings associated with a particular topic, then the crawling process may include searching the identified object (as well as other objects associated with the identified object) for candidate key-author names. In particular embodiments, candidate key-author names may refer to names of people who are potential key-authors. As an example and not by way of limitation, social-networking system 160 may crawl one or more online indexes, databases, or news sources for information related to the topic "2014 Nobel Peace Prize." From this crawling operation, social-networking system 160 may determine that a candidate subject-author related to the topic "2014 Nobel Peace Prize" is 2014 Nobel Peace Prize recipient Malala Yousafzai, a candidate indirect-subject-author is Malala's father, Ziauddin Yousafzai, and a candidate expert-author is Inger-Marie Ytterhorn, a member of the Nobel Peace Prize nominating committee. As another example and not by way of limitation, a crawling operation may identify an person who has authored one or more articles about a particular topic as a candidate expert-author or a candidate journalist with respect to the topic. In particular embodiments, an object, such as for example, a photograph, a video, or an audio file, may not include text in the object itself, but the object may have other textual elements associated with it. As an example and not by way of limitation, a video may have a title, a description, a comment, a tag, or other text (e.g., from when the video is shared with another user) associated with it. In particular embodiments, identifying an object associated with a topic may include searching for particular text strings in one or more textual elements associated with the object. As an example and not by way of limitation, a video of Malala Yousafzai's Nobel Peace Prize acceptance speech may include a description "Yousafzai—Nobel Peace Prize speech," which may be used to identify a key-author (e.g., Malala Yousafzai) or a topic (e.g., 2014 Nobel Peace Prize) associated with the video. Although this disclosure describes crawling particular third-party systems to determine particular information related to key-authors, this disclosure contemplates crawling any suitable third-party systems to determine any suitable information related to key-authors.

In particular embodiments, social-networking system 160 may compare one or more candidate key-author names with names of users of the online social network. As an example and not by way of limitation, social-networking system 160 may compare a candidate key-author name with names of users of the online social network to determine whether the candidate key-author should be identified as a key-author. If a candidate key-author for a particular topic is a user of the online social network who has authored more than a threshold number of objects (e.g., posts or comments) associated with the particular topic, then the candidate key-author may be identified as a key-author. The candidate key-author may be rejected and not identified as a key-author if the candidate key-author is not associated with a user of the online social network or if the candidate key-author is a user of the online social network but has not authored more than a threshold number of objects associated with the particular topic. In particular embodiments, social-networking system 160 may compare one or more candidate key-author names with information from an online index. In particular embodiments, an online index may include an online information source provided by a third-party system 170, such as for example an official webpage (e.g., NOBELPEACEPRIZE.org for information related to the topic "Nobel Peace Prize"), an online information database (e.g., WIKIPEDIA.org, FREEBASE.com, or ARCHIVE.org), or any other suitable online information source. As an example and not by way of limitation, social-networking system 160 may compare a candidate key-author name with names in a WIKIPEDIA.org article about a particular topic to determine whether the candidate key-author should be identified as a key-author with respect to that topic. As another example and not by way of limitation, world chess champion Magnus Carlsen may be identified as a candidate subject-author with respect to the topic "World Chess Championship," and by comparing his name with names in a WIKIPEDIA.org article about the World Chess Championship, social networking system 160 may then identify Magnus Carlsen as a subject-author. A candidate key-author may be rejected and not identified as a key-author with respect to a particular topic if the candidate key-author's name is not correlated with names obtained from online information sources associated with the topic. Although this disclosure describes comparing particular candidate key-author names with particular social-networking information or particular third-party information, this disclosure contemplates comparing any suitable candidate key-author names with any suitable social-networking information or any suitable third-party information.

In particular embodiments, social-networking system 160 may identify one or more key-authors associated with a particular topic by identifying objects in the online social network associated with the topic and extracting one or more candidate key-author names from one or more of the identified objects. As an example and not by way of limitation, social-networking system 160 may search for posts in the online social network associated with a particular topic, and an author of greater than a threshold number of posts associated with the topic may be identified as a candidate key-author. Although this disclosure describes identifying particular objects in an online social network to determine particular information related to key-authors, this disclosure contemplates identifying any suitable objects in an online social network to determine any suitable information related to key-authors.

Scoring Key-Authors

In particular embodiments, after identifying one or more key-authors associated with a particular topic, social-networking system 160 may determine an author-score for each identified key-author associated with the topic. In particular embodiments, an author-score for a key-author may be based at least in part on a relevance of the key-author to the topic. As an example and not by way of limitation, author-scores for key-authors associated with a particular topic may range from 0 to 100, where a score of 0 represents a key-author with little or minimal relevance to the topic, and a score of 100 represents a key-author with a high or maximum relevance to the topic. In particular embodiments, an author-score for a key-author associated with a particular topic may be based at least in part on a number of objects associated with the topic that have been authored by the key-author. As an example and not by way of limitation, a key-author who has authored more than 20 articles or posts on a particular topic may have a higher author-score than a key-author who has authored less than 10 articles or posts on the topic. In particular embodiments, an author-score for a key-author associated with a particular topic may be based at least in part on feedback received by the key-author or the popularity of the key-author. As an example and not by way of limitation, a key-author who has received more than 100 comments or "likes" on articles or posts associated with a particular topic may have a higher author-score than a key-author who has received less than 50 comments or "likes." In particular embodiments, an author-score may be based at least in part on a time or date associated with objects authored by a key-author. As an example and not by way of limitation, a key-author who has authored 10 objects within the past week may have a higher author-score than a key-author who has authored 10 objects over the past two months. Although this disclosure describes determining particular author-scores based on particular information associated with key-authors, this disclosure contemplates determining any suitable author-scores based on any suitable information associated with key-authors.

Retrieving and Scoring Objects

In particular embodiments, in response to a search query associated with a particular topic, social-networking system 160 may retrieve multiple objects of the online social network matching the search query. In particular embodiments, retrieving an object may include retrieving all of the object (e.g., any text, images, identifier, or other information associated with the object), a portion of the object (e.g., a portion of text associated with the object), or an object identifier (object ID) that identifies a particular social-graph element associated with the object. In particular embodiments, retrieved objects may include objects associated with a particular topic that are authored by one or more identified key-authors. As an example and not by way of limitation, the retrieved objects may include objects (e.g., posts, comments, articles, videos, or any other suitable content) authored by one or more top-scoring key-authors, as well as other objects, such as for example, top stories, photos, pages, or posts that are related to the topic. In particular embodiments, each of the identified key-authors whose objects are retrieved may have an author-score greater than a threshold author-score. As an example and not by way of limitation, key-authors may have author-scores in a range of 0 to 100, and the threshold author-score may be 75 so that only objects authored by key-authors with author-scores greater than 75 may be retrieved. As another example and not by way of limitation, social-networking system 160 may identify any suitable number of key-authors (e.g., 5, 10, 20, 30, or 50 key-authors), and the threshold author-score may be set so that the retrieved objects include objects authored by key-authors with author-scores in any suitable top percentile (e.g., author-scores in the top 5%, 10%, 20%, or 40% of key-authors). Although this disclosure describes retrieving particular objects based on particular author-score criteria, this disclosure contemplates retrieving any suitable objects based on any suitable author-score criteria.

In particular embodiments, in response to a search query associated with a particular topic, social-networking system 160 may retrieve objects authored by one or more key-authors. In particular embodiments, social-networking system 160 may determine an object score for each of the retrieved objects associated with the topic and authored by a key-author. In particular embodiments, an object score may be based at least in part on a relevance of the retrieved object to the search query or the particular topic. As an example and not by way of limitation, object scores may range from 0 to 100, where a score of 0 represents an object having little or minimal relevance to the search query, and a score of 100 represents an object with a high or maximum relevance to the search query. As another example and not by way of limitation, an object score may be based at least in part on a keyword match between the search query and the object so that an object with more keyword matches may have a higher object score. As another example and not by way of limitation, an object score may be based at least in part on feedback received by the object or the popularity of the object (e.g., the number of comments or "likes" received by the object or the number of times the object has been viewed or shared with others). As another example and not by way of limitation, an object score may be based at least in part on a time or date associated with the object so that an object posted within the past day may have a higher object score than an object post two weeks ago. Although this disclosure describes particular object scores determined in particular manners, this disclosure contemplates any suitable object scores determined in any suitable manner.

Key-Authors Module

In particular embodiments, after retrieving objects of the online social network matching a search query, social-networking system 160 may generate multiple search-results modules, where each search-results module may include references to one or more of the retrieved objects. As an example and not by way of limitation, the search-results modules may include one or more key-authors-modules (e.g., different modules for different types of key-authors), as well as a top-stories module, a news module, a people module, a photos module, a pages module, or a posts module. In particular embodiments, each search-results module may include one or more references organized in a list. As an example and not by way of limitation, a key-authors module may include a list of 5, 10, 20, or any suitable number of references to objects authored by one or more key-authors. In particular embodiments, a reference to an object may include one or more pieces of information used to provide a brief summary or overview of the object. As an example and not by way of limitation, a reference to an object authored by a key-author may include the name of the key-author, a thumbnail photo of the key-author, a brief summary of the object (e.g., a title, a phrase, or an introductory sentence from the object), or a time or date associated with the object. In particular embodiments, a key-authors-module may include references to one or more of the retrieved objects associated with a particular topic that are authored by at least one of the identified key-authors. In particular embodiments, a key-authors-module may include references to one or more posts, comments, articles, photos, videos, events, applications, or web pages authored by one or more of the identified key-authors. As an example and not by way of limitation, a key-authors-module associated with the topic "2014 Nobel Peace Prize" may include references to one or more of the following: posts by subject-author Malala Yousafzai, a 2014 Nobel Peace Prize recipient, posts by an indirect-subject-author (e.g., Malala's father, Ziauddin Yousafzai), posts by an expert-author (e.g., a member of the Nobel Peace Prize nominating committee), or a video of an interview with subject-author Malala Yousafzai. In particular embodiments, each reference in a key-authors-module may correspond to a retrieved object having an object score greater than a threshold object score. As an example and not by way of limitation, after determining an object score for retrieved objects authored by key-authors, social-networking system 160 may generate a key-authors-module that includes references to any suitable number (e.g., 5, 10, or 20) of top-scoring objects. As another example and not by way of limitation, a key-authors-module may include references to objects having object scores in any suitable top percentile (e.g., object scores in the top 5%, 10%, 20%, or 40% of objects). In particular embodiments, references in a key-authors-module may be ordered according to the object scores for the respective retrieved objects. As an example and not by way of limitation, a key-authors-module may include references to 10 top-scoring objects, and the references may be arranged in order from highest-scoring object to lowest-scoring object. In particular embodiments, social-networking system 160 may generate multiple key-authors-modules, where each key-authors-module corresponds to a particular type of key-author. As an example and not by way of limitation, social-networking system 160 may generate key-authors-modules associated with one or more of the following types of key-authors: subject-authors, expert-authors, journalists, derivative-expert-authors, eyewitness-authors, or indirect-subject-authors. As an example and not by way of limitation, social-networking system 160 may generate a subject-author-module (with posts by people referenced in objects associated with the topic), an expert-author-module (with posts by people knowledgeable about the topic), and an eyewitness-author-module (with posts by people whose timeframe and location match that of the topic). Although this disclosure describes generating particular search-results modules in particular manners, this disclosure contemplates generating particular search-results modules in any suitable manner.

Search-Results Page

Figure 5:
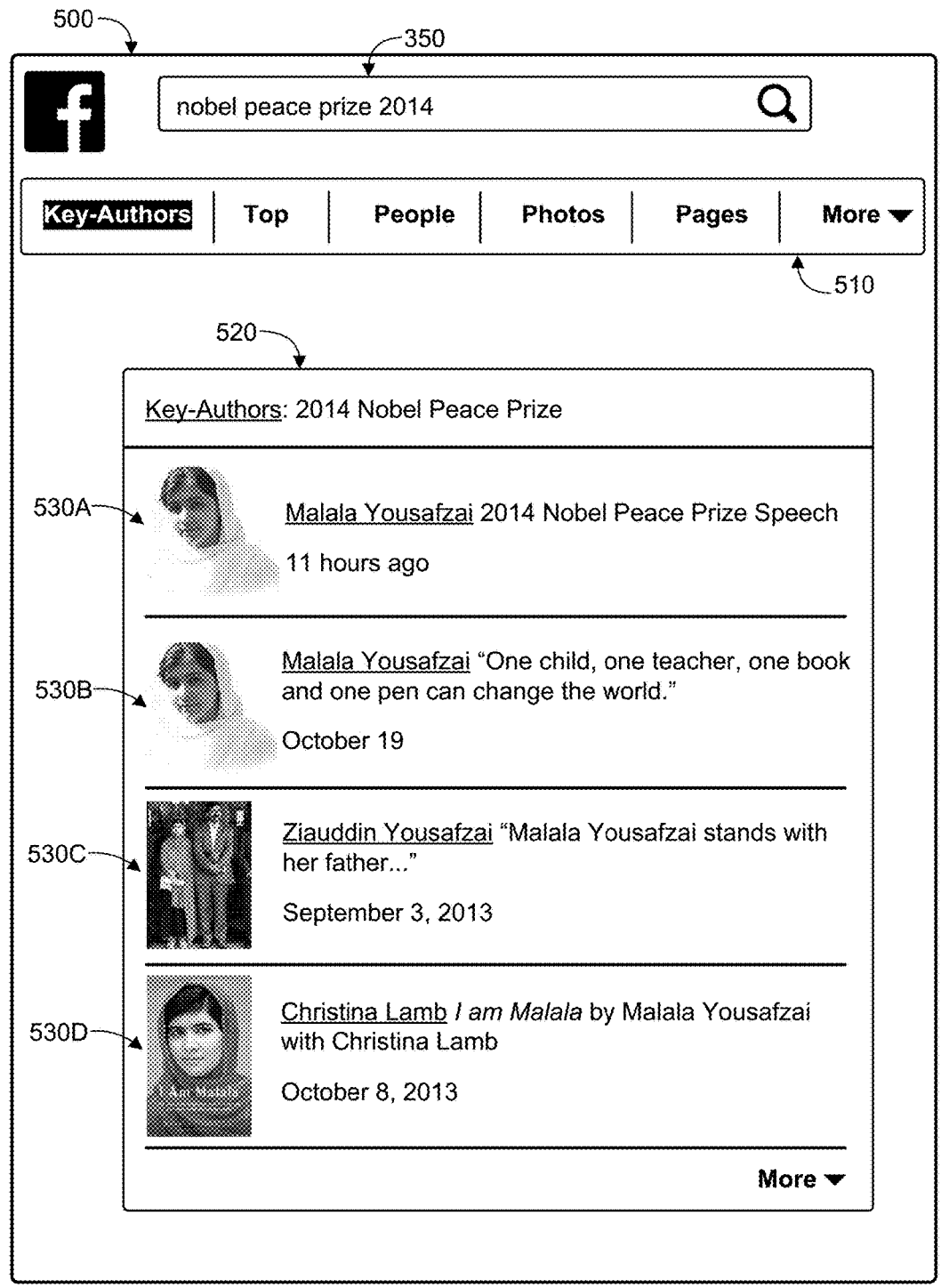
FIG. 5 illustrates an example search-results page.

FIG. 5 illustrates an example search-results page 500. In particular embodiments, social-networking system 160 may send, to a client device of a querying user for display, a search-results page responsive to a search query. In particular embodiments, a search-results page may include multiple search-results modules, where at least one of the search-results modules is a key-authors-module. As an example and not by way of limitation, a search-results page associated with the topic "Futbol Club Barcelona" may include a key-authors-module with references to posts by one or more of the following: expert-author Lionel Messi, other team members identified as expert-authors, or journalists associated with the topic "Futbol Club Barcelona." As another example and not by way of limitation, a search-results page may include a subject-author-module and an expert-author-module. In particular embodiments, a search-results page may include 1, 2, 3, 5, 10, or any suitable number of search-results modules. As an example and not by way of limitation, in addition to one or more key-authors-modules, a search-results page may also include one or more of the following: a top-stories module, a news module, a people module, a photos module, a pages module, or a posts module.

In the example of FIG. 5, the search query "nobel peace prize 2014" has been entered into query field 350 on a querying user's client device. Social-networking system 160 may determine that the search query is associated with the topic "2014 Nobel Peace Prize." In response to the search query, social-networking system 160 may send search-results page 500, which includes a key-authors module, a top-stories module, a people module, a photos module, and a pages module. In the example of FIG. 5, the search-results modules are listed in search-results module list 510, and the user can select (e.g., by clicking on or tapping) one or more search-results modules from list 510 for display. In FIG. 5, key-authors module 520 has been selected for display, and key-authors module 520 includes references to posts from various key-authors associated with the topic "2014 Nobel Peace Prize." References 530A and 530B are references to posts by subject-author and Nobel Peace Prize recipient Malala Yousafzai; reference 530C is a reference to a post by Malala's father Ziauddin Yousafzai (an indirect-subject-author); and reference 530D is a reference to a post by expert-author Christina Lamb, a co-author of a book written with Malala. Reference 530A includes the name of the key-author (Malala Yousafzai), a thumbnail photo of Malala, a brief summary ("2014 Nobel Peace Prize Speech"), and a time associated with the post ("11 hours ago"). If a user selects (e.g., clicks on or taps) a particular reference from a search-result module, the object associated with that reference may be displayed on the user's client device. Although this disclosure describes and FIG. 5 illustrates particular search-results pages that include particular search-results modules, this disclosure contemplates any suitable search-results pages that include any suitable search-results modules.

Figure 6:
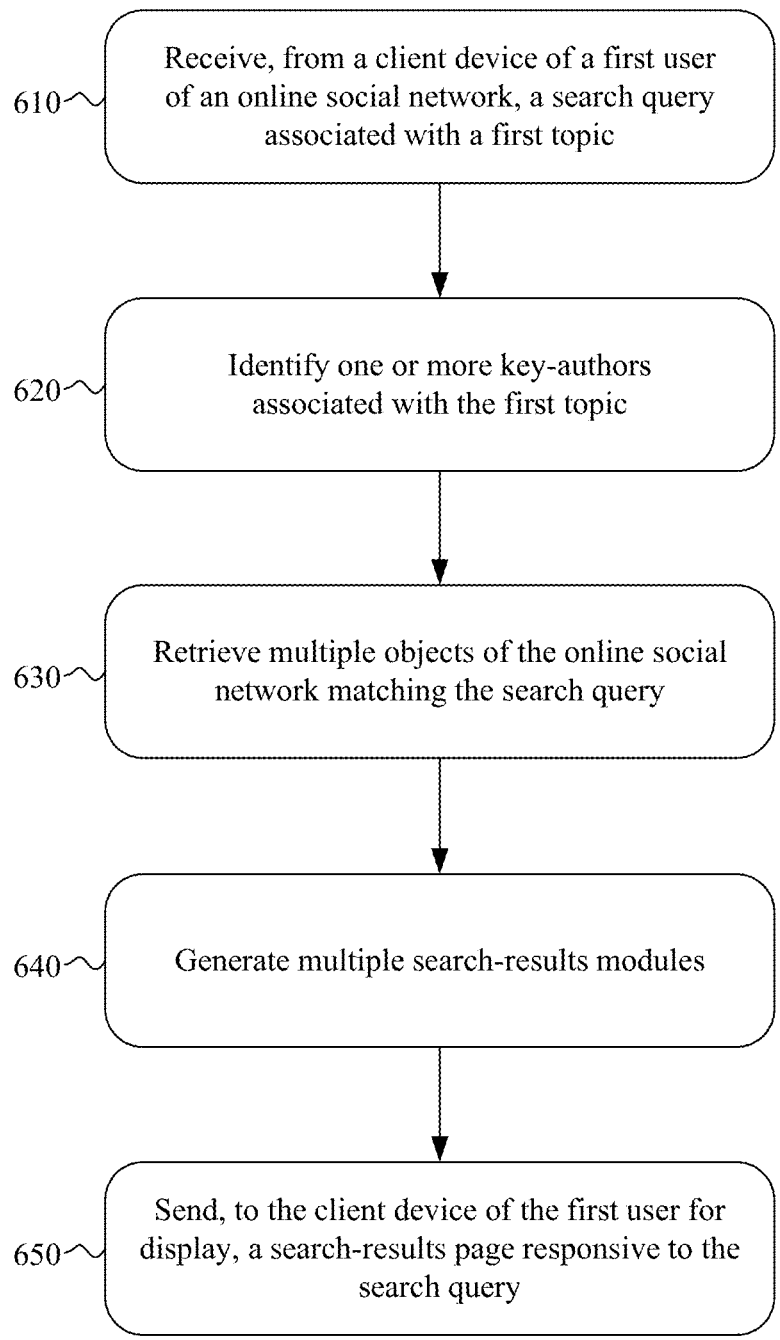
FIG. 6 illustrates an example method for searching for content by key-authors on online social networks.

FIG. 6 illustrates example method 600 for searching for content by key-authors on online social networks. The method may begin at step 610, where social-networking system 160 may receive, from a client device of a first user of the online social network, a search query associated with a first topic. At step 620, social-networking system 160 may identify one or more key-authors associated with the first topic. At step 630, social-networking system 160 may retrieve multiple objects of the online social network matching the search query. In particular embodiments, one or more of the retrieved objects may be associated with the first topic and may be authored by at least one of the identified key-authors. At step 640, social-networking system 160 may generate multiple search-results modules, where each search-result module may include references to one or more of the retrieved objects. In particular embodiments, at least one of the search-results modules may be a key-authors-module that includes references to one or more of the retrieved objects associated with the first topic that are authored by at least one of the identified key-authors. At step 650, social-networking system 160 may send, to the client device of the first user for display, a search-results page responsive to the search query, at which point the method may end. In particular embodiments, the search-results page may include multiple search-results modules, where at least one of the search-results modules is the key-authors-module. Particular embodiments may repeat one or more steps of method 600 of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for searching for content by key-authors on online social networks, including the particular steps of the method of FIG. 6, this disclosure contemplates any suitable method for searching for content by key-authors on online social networks including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Social Graph Affinity and Coefficient

In particular embodiments, social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part a the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 160 may calculate a coefficient based on a user's actions. Social-networking system 160 may monitor such actions on the online social network, on a third-party system 170, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 160 may calculate a coefficient based on the user's actions with particular types of content. The content may be associated with the online social network, a third-party system 170, or another suitable system. The content may include users, profile pages, posts, news stories, headlines, instant messages, chat room conversations, emails, advertisements, pictures, video, music, other suitable objects, or any combination thereof. Social-networking system 160 may analyze a user's actions to determine whether one or more of the actions indicate an affinity for subject matter, content, other users, and so forth. As an example and not by way of limitation, if a user may make frequently posts content related to "coffee" or variants thereof, social-networking system 160 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 160 may calculate a coefficient based on the type of relationship between particular objects. Referencing the social graph 200, social-networking system 160 may analyze the number and/or type of edges 206 connecting particular user nodes 202 and concept nodes 204 when calculating a coefficient. As an example and not by way of limitation, user nodes 202 that are connected by a spouse-type edge (representing that the two users are married) may be assigned a higher coefficient than a user nodes 202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social-networking system 160 may determine that the user has a higher coefficient with respect to the first photo than the second photo because having a tagged-in-type relationship with content may be assigned a higher weight and/or rating than having a like-type relationship with content. In particular embodiments, social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 200. As an example and not by way of limitation, social-graph entities that are closer in the social graph 200 (i.e., fewer degrees of separation) may have a higher coefficient than entities that are further apart in the social graph 200.

In particular embodiments, social-networking system 160 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, social-networking system 160 may determine that the user has a higher coefficient for the airport than the gas station based on the proximity of the airport to the user.

In particular embodiments, social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 160 may provide information that is relevant to user's interests and current circumstances, increasing the likelihood that they will find such information of interest. In particular embodiments, social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 160 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, social-networking system 160 may calculate the coefficient (or access the coefficient information if it has previously been calculated and stored). In particular embodiments, social-networking system 160 may measure an affinity with respect to a particular process. Different processes (both internal and external to the online social network) may request a coefficient for a particular object or set of objects. Social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

Systems and Methods

Figure 7:
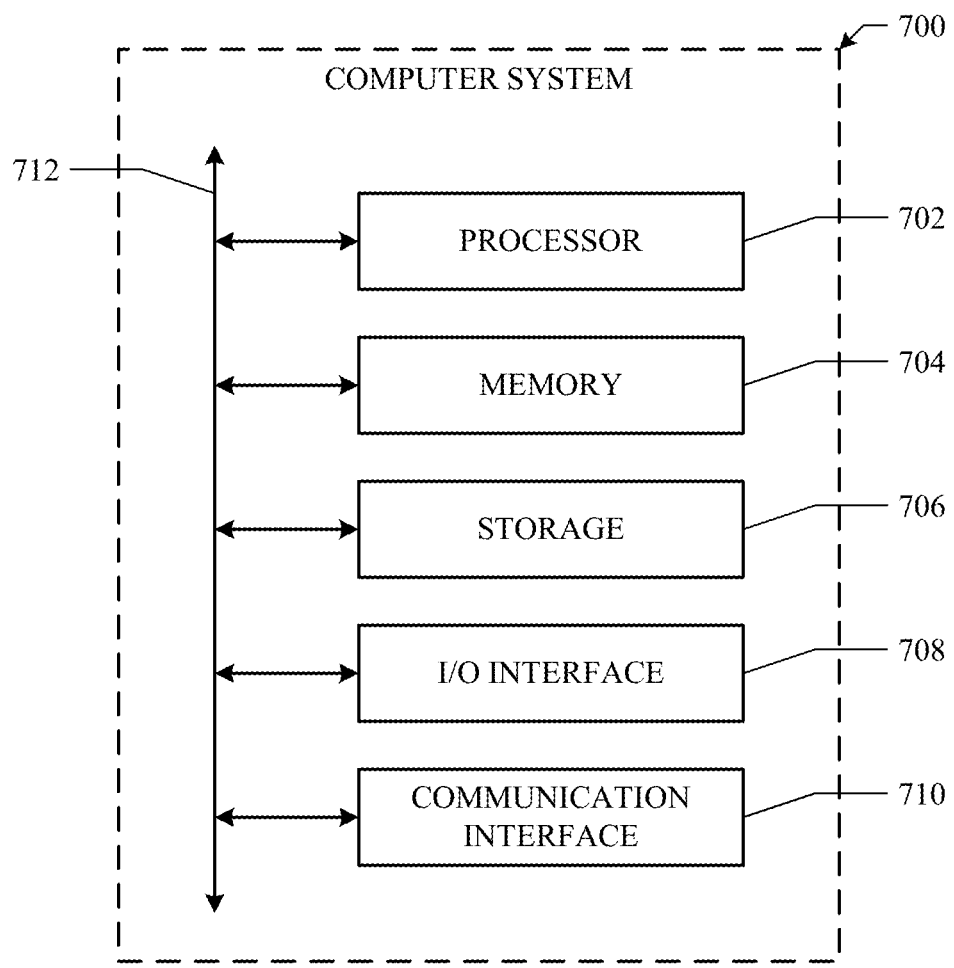
FIG. 7 illustrates an example computer system.

FIG. 7 illustrates an example computer system 700. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700. Herein, reference to a computer system may encompass a computing device, and vice versa, where appropriate. Moreover, reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising, by one or more computing devices of an online social network:
    receiving, from a client device of a first user of the online social network, a search query comprising one or more n-grams, wherein the search query is associated with a first topic, wherein the first topic is an identifier corresponding to a particular event or subject matter and is determined from a topic database of the online social network comprising an index of a plurality of pre-identified topics;
    identifying one or more key-authors associated with the first topic, each key-author being a second user of the online social network that has been determined to be relevant to the first topic from a key-author database comprising an index of a plurality of pre-identified key-authors corresponding to the plurality of pre-identified topics;
    retrieving a plurality of objects of the online social network matching the one or more n-grams of the search query, wherein one or more of the retrieved objects are associated with the first topic and are authored by at least one of the identified key-authors;
    generating a plurality of search-results modules, each search-result module comprising references to a plurality of the retrieved objects matching the one or more n-grams of the search query, wherein at least one of the search-results modules is a key-authors-module comprising references to the plurality of the retrieved objects matching the one or more n-grams of the search query associated with the first topic, each of the retrieved objects matching the one or more n-grams of the search query referenced in the key-authors-module being authored by at least one of the identified key-authors that has been determined to be relevant to the first topic; and
    sending, to the client device of the first user for display, a search-results page responsive to the search query, the search-results page comprising a plurality of search-results modules, wherein at least one of the search-results modules is the key-authors-module comprising references to the plurality of the retrieved objects authored by one or more of the identified key-authors.

2. The method of claim 1, wherein the identified key-authors comprise one or more subject-authors, each subject-author being referenced in one or more of the retrieved objects associated with the first topic.

3. The method of claim 1, wherein the identified key-authors comprise one or more expert-authors, each expert-author being an author of greater than a threshold number of objects associated with the first topic.

4. The method of claim 1, wherein the identified key-authors comprise one or more journalists, each journalist being an author of a plurality of objects associated with the first topic.

5. The method of claim 1, wherein the identified key-authors comprise one or more derivative-expert-authors, each derivative-expert-author being an author of one or more objects associated with the first topic, wherein the objects authored by the derivative-expert-authors have received greater than a threshold number of comments from one or more expert-authors.

6. The method of claim 1, wherein the identified key-authors comprise one or more eyewitness-authors, each eyewitness-author being associated with a timeframe and a location that are also associated with the first topic.

7. The method of claim 1, further comprising accessing a social graph comprising a plurality of nodes and a plurality of edges connecting the nodes, each of the edges between two of the nodes representing a single degree of separation between them, and each node corresponding to an object associated with the online social network.

8. The method of claim 7, wherein the identified key-authors comprise one or more indirect-subject-authors, each indirect-subject-author being within a threshold degree of separation of a subject-author within the social graph.

9. The method of claim 1, wherein identifying the one or more key-authors associated with the first topic comprises:
    crawling a third-party system to identify one or more objects associated with the first topic; and
    extracting one or more candidate key-author names from one or more of the identified objects.

10. The method of claim 9, further comprising comparing the one or more candidate key-author names with names of users of the online social network.

11. The method of claim 9, further comprising comparing the one or more candidate key-author names with information from an online index.

12. The method of claim 1, wherein identifying the one or more key-authors associated with the first topic comprises:
    identifying objects in the online social network associated with the first topic; and
    extracting one or more candidate key-author names from one or more of the identified objects.

13. The method of claim 1, further comprising determining an author-score for each of the identified key-authors, the author-score for each identified key-author based at least in part on a relevance of the key-author to the first topic.

14. The method of claim 13, wherein each of the at least one of the identified key-authors has an author-score greater than a threshold author-score.

15. The method of claim 1, wherein the key-authors-module comprises references to one or more posts, comments, articles, photos, videos, events, applications, or web pages authored by one or more of the identified key-authors.

16. The method of claim 1, further comprising determining an object score for each of the retrieved objects associated with the first topic and authored by at least one of the identified key-authors, the object score being based at least in part on a relevance of the retrieved object to the search query.

17. The method of claim 16, wherein each reference in the key-authors-module corresponds to a retrieved object having an object score greater than a threshold object score.

18. The method of claim 16, wherein the references in the key-authors-module are ordered according to the object scores for the respective retrieved objects.

19. One or more computer-readable non-transitory storage media embodying software that is operable when executed to:
    receive, from a client device of a first user of the online social network, a search query comprising one or more n-grams, wherein the search query is associated with a first topic, wherein the first topic is an identifier corresponding to a particular event or subject matter and is determined from a topic database of the online social network comprising an index of a plurality of pre-identified topics;

identify one or more key-authors associated with the first topic, each key-author being a second user of the online social network that has been determined to be relevant to the first topic from a key-author database comprising an index of a plurality of pre-identified key-authors corresponding to the plurality of pre-identified topics;

retrieve a plurality of objects of the online social network matching the one or more n-grams of the search query, wherein one or more of the retrieved objects are associated with the first topic and are authored by at least one of the identified key-authors;

generate a plurality of search-results modules, each search-result module comprising references to a plurality of the retrieved objects matching the one or more n-grams of the search query, wherein at least one of the search-results modules is a key-authors-module comprising references to the plurality of the retrieved objects matching the one or more n-grams of the search query associated with the first topic, each of the retrieved objects matching the one or more n-grams of the search query referenced in the key-authors-module being authored by at least one of the identified key-authors that has been determined to be relevant to the first topic; and send, to the client device of the first user for display, a search-results page responsive to the search query, the search-results page comprising a plurality of search-results modules, wherein at least one of the search-results modules is the key-authors-module comprising references to the plurality of the retrieved objects authored by one or more of the identified key-authors.

20. A system comprising: one or more processors; and a memory coupled to the processors comprising instructions executable by the processors, the processors operable when executing the instructions to:

receive, from a client device of a first user of the online social network, a search query comprising one or more n-grams, wherein the search query is associated with a first topic, wherein the first topic is an identifier corresponding to a particular event or subject matter and is determined from a topic database of the online social network comprising an index of a plurality of pre-identified topics;

identify one or more key-authors associated with the first topic, each key-author being a second user of the online social network that has been determined to be relevant to the first topic from a key-author database comprising an index of a plurality of pre-identified key-authors corresponding to the plurality of pre-identified topics;

retrieve a plurality of objects of the online social network matching the one or more n-grams of the search query, wherein one or more of the retrieved objects are associated with the first topic and are authored by at least one of the identified key-authors;

generate a plurality of search-results modules, each search-result module comprising references to a plurality of the retrieved objects matching the one or more n-grams of the search query, wherein at least one of the search-results modules is a key-authors-module comprising references to the plurality of the retrieved objects matching the one or more n-grams of the search query associated with the first topic, each of the retrieved objects matching the one or more n-grams of the search query referenced in the key-authors-module being authored by at least one of the identified key-authors that has been determined to be relevant to the first topic; and send, to the client device of the first user for display, a search-results page responsive to the search query, the search-results page comprising a plurality of search-results modules, wherein at least one of the search-results modules is the key-authors-module comprising references to the plurality of the retrieved objects authored by one or more of the identified key-authors.

21. The method of claim 1, wherein a second user of the online social network is determined to be relevant to the first topic by being associated with the topic or by being knowledgeable about the topic.

22. The system of claim 20, wherein the identified key-authors comprise one or more subject-authors, each subject-author being referenced in one or more of the retrieved objects associated with the first topic.

23. The system of claim 20, wherein the identified key-authors comprise one or more expert-authors, each expert-author being an author of greater than a threshold number of objects associated with the first topic.

24. The system of claim 20, wherein the identified key-authors comprise one or more journalists, each journalist being an author of a plurality of objects associated with the first topic.

25. The system of claim 20, wherein the identified key-authors comprise one or more derivative-expert-authors, each derivative-expert-author being an author of one or more objects associated with the first topic, wherein the objects authored by the derivative-expert-authors have received greater than a threshold number of comments from one or more expert-authors.

26. The system of claim 20, wherein the identified key-authors comprise one or more eyewitness-authors, each eyewitness-author being associated with a timeframe and a location that are also associated with the first topic.

27. The system of claim 20, wherein the processors are further operable when executing the instructions to access a social graph comprising a plurality of nodes and a plurality of edges connecting the nodes, each of the edges between two of the nodes representing a single degree of separation between them, and each node corresponding to an object associated with the online social network.

28. The system of claim 27, wherein the identified key-authors comprise one or more indirect-subject-authors, each indirect-subject-author being within a threshold degree of separation of a subject-author within the social graph.

29. The system of claim 20, wherein to identify the one or more key-authors associated with the first topic comprises:
to crawl a third-party system to identify one or more objects associated with the first topic; and
to extract one or more candidate key-author names from one or more of the identified objects.

30. The system of claim 29, wherein the processors are further operable when executing the instructions to compare the one or more candidate key-author names with names of users of the online social network.

31. The system of claim 29, wherein the processors are further operable when executing the instructions to compare the one or more candidate key-author names with information from an online index.

32. The system of claim 20, wherein to identify the one or more key-authors associated with the first topic comprises:
to identify objects in the online social network associated with the first topic; and to extract one or more candidate key-author names from one or more of the identified objects.

33. The system of claim 20, wherein the processors are further operable when executing the instructions to determine an author-score for each of the identified key-authors, the author-score for each identified key-author based at least in part on a relevance of the key-author to the first topic.

34. The system of claim 33, wherein each of the at least one of the identified key-authors has an author-score greater than a threshold author-score.

35. The system of claim 20, wherein the key-authors-module comprises references to one or more posts, comments, articles, photos, videos, events, applications, or web pages authored by one or more of the identified key-authors.

36. The system of claim 20, wherein the processors are further operable when executing the instructions to determine an object score for each of the retrieved objects associated with the first topic and authored by at least one of the identified key-authors, the object score being based at least in part on a relevance of the retrieved object to the search query.

37. The system of claim 36, wherein each reference in the key-authors-module corresponds to a retrieved object having an object score greater than a threshold object score.

38. The system of claim 36, wherein the references in the key-authors-module are ordered according to the object scores for the respective retrieved objects.

39. The system of claim 20, wherein a second user of the online social network is determined to be relevant to the first topic by being associated with the topic or by being knowledgeable about the topic.

40. The system of claim 20, wherein the topic database and the key-author database are the same database.

\* \* \* \* \*